US010551265B2

(12) United States Patent
Cook et al.

(10) Patent No.: US 10,551,265 B2
(45) Date of Patent: Feb. 4, 2020

(54) PRESSURE SENSING USING QUANTUM MOLECULAR ROTATIONAL STATE TRANSITIONS (71) Applicant: TEXAS INSTRUMENTS INCORPORATED, Dallas, TX (US)

(72) Inventors: Benjamin Stassen Cook, Addison, TX (US); Django Trombley, Dallas, TX (US); Adam Joseph Fruehling, Garland, TX (US); Juan Alejandro Herbsommer, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 210 days.

(21) Appl. No.: 15/698,445

(22) Filed: Sep. 7, 2017

(65) Prior Publication Data

US 2019/0072447 A1  Mar. 7, 2019

(51) Int. Cl.
*G04F 5/14* (2006.01)
*G01L 11/00* (2006.01)
*G01L 11/02* (2006.01)

(52) U.S. Cl.
CPC ............... *G01L 11/00* (2013.01); *G04F 5/14* (2013.01)

(58) Field of Classification Search
CPC ............. G01F 5/14; G01L 11/00; G01L 11/02
See application file for complete search history.

(56) References Cited

U.S. PATENT DOCUMENTS

| 4,147,431 | A | * | 4/1979 | Mann | G01L 11/02 |
| | | | | | 250/458.1 |
| 4,826,616 | A | | 5/1989 | Tanino | |
| 5,107,231 | A | | 4/1992 | Knox | |
| 5,198,786 | A | | 3/1993 | Russell et al. | |
| 5,218,373 | A | | 6/1993 | Heckaman et al. | |
| 5,412,186 | A | | 5/1995 | Gale | |
| 5,459,324 | A | * | 10/1995 | Fima | G01K 11/20 |
| | | | | | 250/338.5 |
| 5,821,836 | A | | 10/1998 | Katehi et al. | |
| 6,131,256 | A | | 10/2000 | Dydyk et al. | |
| 6,236,366 | B1 | | 5/2001 | Yamamoto et al. | |
| 6,362,706 | B1 | | 3/2002 | Song et al. | |
| 6,498,550 | B1 | | 12/2002 | Miller et al. | |
| 6,630,359 | B1 | | 10/2003 | Caillat et al. | |

(Continued)

FOREIGN PATENT DOCUMENTS

| JP | 6428974 | 1/1989 |
| WO | 2014037016 | 3/2014 |
| WO | 2016161215 | 10/2016 |

OTHER PUBLICATIONS

International Search Report for PCT/US2018/050253 dated Jan. 10, 2019.

(Continued)

*Primary Examiner* — Nguyen Q. Ha
(74) *Attorney, Agent, or Firm* — Michael A. Davis, Jr.; Charles A. Brill; Frank D. Cimino (57) ABSTRACT

A pressure transducer includes a cavity, a first dipolar molecule disposed within the cavity, and a second dipolar molecule disposed within the cavity. The first dipolar molecule exhibits a quantum rotational state transition at a fixed frequency with respect to cavity pressure. The second dipolar molecule exhibits a quantum rotation state transition at a frequency that varies with cavity pressure.

19 Claims, 3 Drawing Sheets

(56) References Cited

U.S. PATENT DOCUMENTS

| | | |
|---|---|---|
| 6,670,866 B2 | 12/2003 | Ella et al. |
| 6,842,088 B2 | 1/2005 | Yamada et al. |
| 6,989,723 B2 | 1/2006 | Komuro et al. |
| 6,998,691 B2 | 2/2006 | Baugh |
| 7,388,454 B2 | 6/2008 | Ruby et al. |
| 7,408,428 B2 | 8/2008 | Larson, III |
| 8,098,208 B2 | 1/2012 | Ficker et al. |
| 8,268,642 B2 | 9/2012 | Yoshitomi et al. |
| 8,293,661 B2 | 10/2012 | Yamazaki |
| 8,586,178 B2 | 11/2013 | Schwanke et al. |
| 9,436,902 B1 | 9/2016 | Koepp et al. |
| 9,529,334 B2 | 12/2016 | Herbsommer et al. |
| 9,735,754 B2 | 8/2017 | Shin et al. |
| 2002/0038989 A1 | 4/2002 | Larson, III |
| 2002/0068018 A1 | 6/2002 | Pepper et al. |
| 2002/0098611 A1 | 7/2002 | Chang et al. |
| 2003/0015707 A1 | 1/2003 | Bosco et al. |
| 2003/0048500 A1 | 3/2003 | Fala et al. |
| 2003/0107459 A1 | 6/2003 | Takahashi et al. |
| 2004/0142484 A1 | 7/2004 | Berlin et al. |
| 2004/0166577 A1 | 8/2004 | Storek et al. |
| 2005/0023932 A1 | 2/2005 | Inoue et al. |
| 2006/0022761 A1 | 2/2006 | Abeles |
| 2006/0076632 A1 | 4/2006 | Palmateer et al. |
| 2006/0144150 A1* | 7/2006 | Wu .............. G01L 11/02 73/705 |
| 2007/0189359 A1* | 8/2007 | Chen .............. B82Y 30/00 374/161 |
| 2008/0319285 A1 | 12/2008 | Hancock |
| 2010/0182102 A1 | 7/2010 | Kuypers et al. |
| 2010/0259334 A1 | 10/2010 | Briggs |
| 2010/0327701 A1 | 12/2010 | Grannen et al. |
| 2011/0140971 A1 | 6/2011 | Schwanke et al. |
| 2012/0266681 A1* | 10/2012 | Baumann .............. G01L 11/02 73/705 |
| 2013/0176703 A1 | 7/2013 | Hopper et al. |
| 2014/0155295 A1 | 6/2014 | Hindson et al. |
| 2014/0210835 A1 | 7/2014 | Hong et al. |
| 2014/0347074 A1 | 11/2014 | Nadeau |
| 2014/0368376 A1 | 12/2014 | Nadeau et al. |
| 2014/0368377 A1 | 12/2014 | Nadeau et al. |
| 2014/0373599 A1 | 12/2014 | Trombley et al. |
| 2015/0144297 A1* | 5/2015 | Toivonen .............. G01L 11/02 165/11.1 |
| 2015/0123748 A1 | 7/2015 | Stevenson |
| 2015/0277386 A1 | 10/2015 | Passilly et al. |
| 2016/0091663 A1 | 3/2016 | Taylor |
| 2016/0233178 A1 | 8/2016 | Lamy et al. |
| 2017/0073223 A1 | 3/2017 | Nasiri et al. |
| 2017/0125660 A1 | 5/2017 | Stephanou et al. |
| 2017/0130102 A1 | 5/2017 | Campbell et al. |
| 2018/0159547 A1 | 6/2018 | Herbsommer et al. |

OTHER PUBLICATIONS

Alvarez, A.L. et al; "The Application of Microencapsulation Techniques in the Treatment of Endodontic and Periodontal Diseases" Pharmaceutics; 2011 abstract p. 540-548.

Steinberg, D. et al; "A New Degradable Controlled Release Device for Treatment of Periodontal Disease: In Vitro Release Study"; J. Periodontology; 1990; p. 393 lines 1-17; p. 394 col. 1 lines 5-14.

Xiong, R. et al.; "Towards Theranostic Multicompartment Microcapsules: in situ Diagnostics and Laser-induced Treatment", Theranostics; 2013; pp. 145-149.

International Search Report for PCT/US2018/049513 dated Nov. 15, 2018.

International Search Report for PCT/US2018/049940 dated Dec. 13, 2018.

International Search Report for PCT/US2018/049949 dated Dec. 13, 2018.

International Search Report for PCT/US2018/047105 dated Dec. 27, 2018.

International Search Report for PCT/US2018/049943 dated Dec. 27, 2018.

\* cited by examiner

PRESSURE SENSING USING QUANTUM MOLECULAR ROTATIONAL STATE TRANSITIONS

BACKGROUND

Various applications require that the integrity of sealed chamber be maintained to insure proper equipment operation. For example, for a housing intended to maintain a low internal pressure, a leak in the housing may allow ingress of fluid that dilutes or contaminates the contents of the housing to the extent that housing contents are no longer useable for the intended purpose. In one particular application, the waveguide of a chip-scale atomic clock contains a selected vapor and requires that a proper seal be maintained to insure the pressure of the vapor and proper operation of the clock.

SUMMARY

Apparatus and method for measuring pressure of sealed cavity are disclosed herein. In one embodiment, a pressure transducer includes a cavity, a first dipolar molecule disposed within the cavity, and a second dipolar molecule disposed within the cavity. The first dipolar molecule exhibits a quantum molecular rotational state transition at a fixed frequency with respect to cavity pressure. The second dipolar molecule exhibits a quantum molecular rotational state transition at a frequency that varies with cavity pressure.

In another embodiment, a method for measuring pressure in a cavity includes transmitting a signal into the cavity. The cavity contains a first dipolar molecule that exhibits a quantum molecular rotational state transition at a fixed frequency with respect to cavity pressure, and a second dipolar molecule that exhibits a quantum molecular rotational state transition at a frequency that varies with cavity pressure. The method further includes determining the pressure in the cavity based on a difference of the frequencies of the quantum molecular rotational state transition of the first dipolar molecule and the second dipolar molecule.

In a further embodiment, a clock generator includes a hermetically sealed cavity formed in a silicon substrate, clock generation circuitry, and pressure monitoring circuitry. A first dipolar molecule and a second dipolar molecule are disposed within the cavity. The first dipolar molecule exhibits a quantum molecular rotational state transition at a fixed frequency with respect to cavity pressure. The second dipolar molecule exhibits a quantum molecular rotational state transition at a frequency that varies with cavity pressure. The clock generation circuitry is configured to generate an output clock signal based on the fixed frequency of the first dipolar molecule. The pressure monitoring circuitry is configured to determine the pressure within the cavity based on a difference of the frequencies of the quantum molecular rotational state transition of the first dipolar molecule and the second dipolar molecule.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Conventional pressure measurement employs a variety of transducer technologies. Various pressure transducer technologies measure strain as an indicator pressure. Other transducer technologies measure particle density or thermal changes to determine pressure. Each conventional technology has its advantages and disadvantages. Generally, each of the technologies requires the addition of measurement apparatus to a system, and some of the technologies require that the apparatus have access to the pressurized media (e.g., access to the interior of pressure vessel). In many applications the addition of pressure measurement apparatus is undesirable or impossible. For example, the size and/or structure of a system may preclude the addition of pressure measurement apparatus.

Embodiments of the present disclosure include pressure measurement systems that allow for measurement of pressure in a sealed cavity without addition pressure sensors and associated measurement apparatus. In some embodiments, the cavity is constructed in a substrate material (e.g., a semiconductor or ceramic material) and is relatively small in size. For example, in some embodiments, the cavity is a waveguide of a millimeter wave chip scale atomic clock constructed via a microelectromechanical system (MEMS) fabrication process. The waveguide contains selected dipolar molecules at a pressure chosen to optimize the amplitude of a signal absorption peak of the molecules detected at an output of the waveguide. Too much deviation from the chosen pressure may negatively affect the operation of the clock.

Dipolar molecules have quantum rotational states that can be measured through electromagnetic wave absorption.

Depending on the chemical structure of the molecule, the frequency of quantum rotational state transition may either be fixed or variable as a function of pressure. In embodiments of the pressure measurement techniques disclosed herein, a cavity contains two different dipolar molecules. One of the molecules has a frequency of quantum rotational state transition that varies with pressure. Embodiments measure the peak absorption frequencies of both molecules. The difference in the two frequencies is indicative of the pressure in the cavity.

Figure 1:
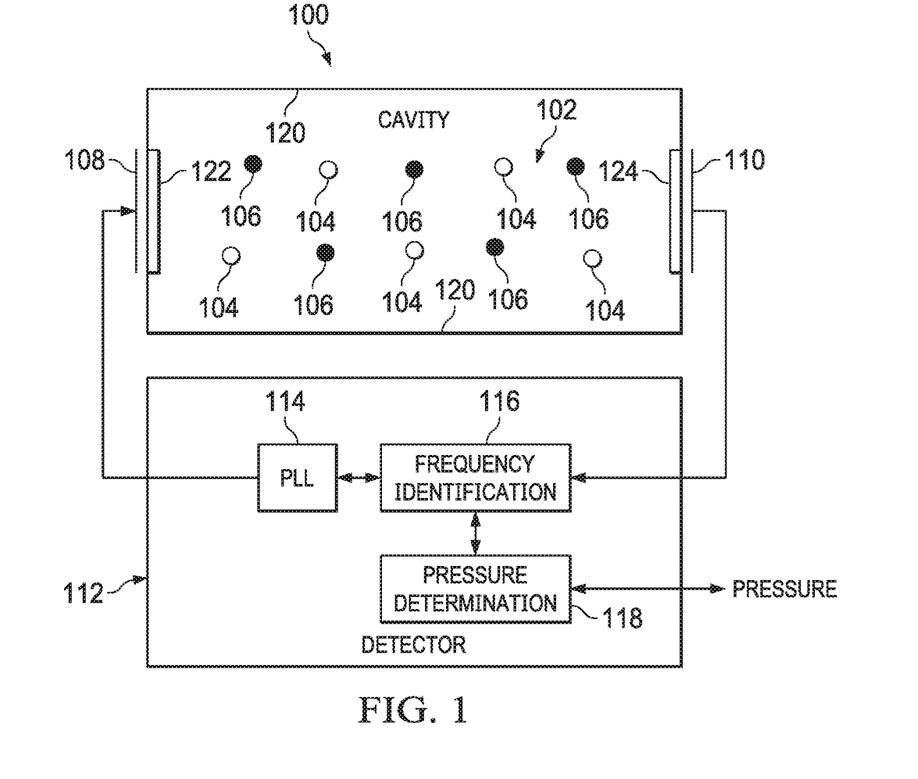
FIG. 1 shows a block diagram for a pressure transducer that measures pressure based on the frequencies of quantum rotational state transition of two dipolar molecules in accordance with various embodiments.

FIG. 1 shows a block diagram for a pressure transducer 100 that measures pressure based on the frequencies of quantum rotational state transition of two dipolar molecules in accordance with various embodiments. The pressure transducer 100 includes a cavity 102, molecules 104 and 106, transmit antenna 108, receive antenna 110, and detector circuitry 112. The cavity 102 is a sealed chamber or container. In some embodiments the cavity 102 is formed in a substrate material (e.g., a semiconductor or ceramic substrate). The cavity 102 includes conductive interior surfaces 120 and non-conductive apertures 122 and 124. The cavity 102 with conductive interior surfaces 120 forms a waveguide. The non-conductive aperture 122 provides an electromagnetic field entrance to the cavity 102. The non-conductive aperture 124 provides an electromagnetic field exit from the cavity 102.

Figure 2:
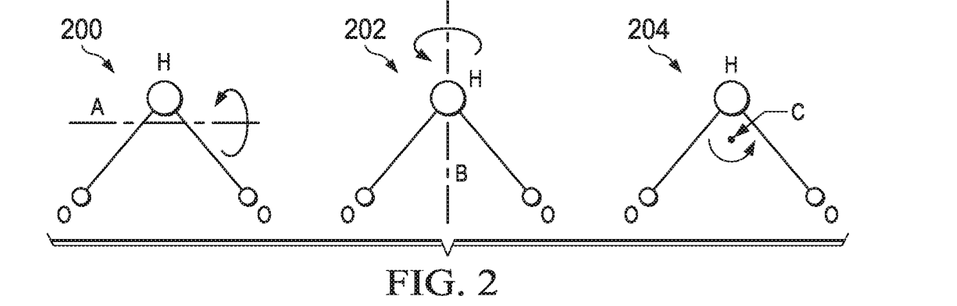
FIG. 2 shows three rotation modes of a dipolar molecule along three orthogonal axes.

The cavity 102 contains vapor molecules 104 and 106. The molecules 104 and 106 are dipolar molecules that exhibit quantum molecular rotational state transitions at different frequencies. That is, the molecules 104 and 106 absorb energy at different frequencies when transitioning between quantum rotational states. Dipolar molecules 104 exhibit quantum molecular rotational state transition at a frequency that is unaffected by the pressure within the cavity 102. For example, as the pressure within the cavity 102 increases, the frequency of a quantum rotational state transition of the dipolar molecules 104 remains constant. In some embodiments, the dipolar molecules 104 are water molecules. FIG. 2 includes illustrations 200, 202 and 204 respectively showing three rotational modes of a dipolar water molecule along three orthogonal axes. In some embodiments, the dipolar molecules 104 are molecules other than water that exhibit a frequency of quantum rotational state transition that is unaffected by pressure.

Figure 3:
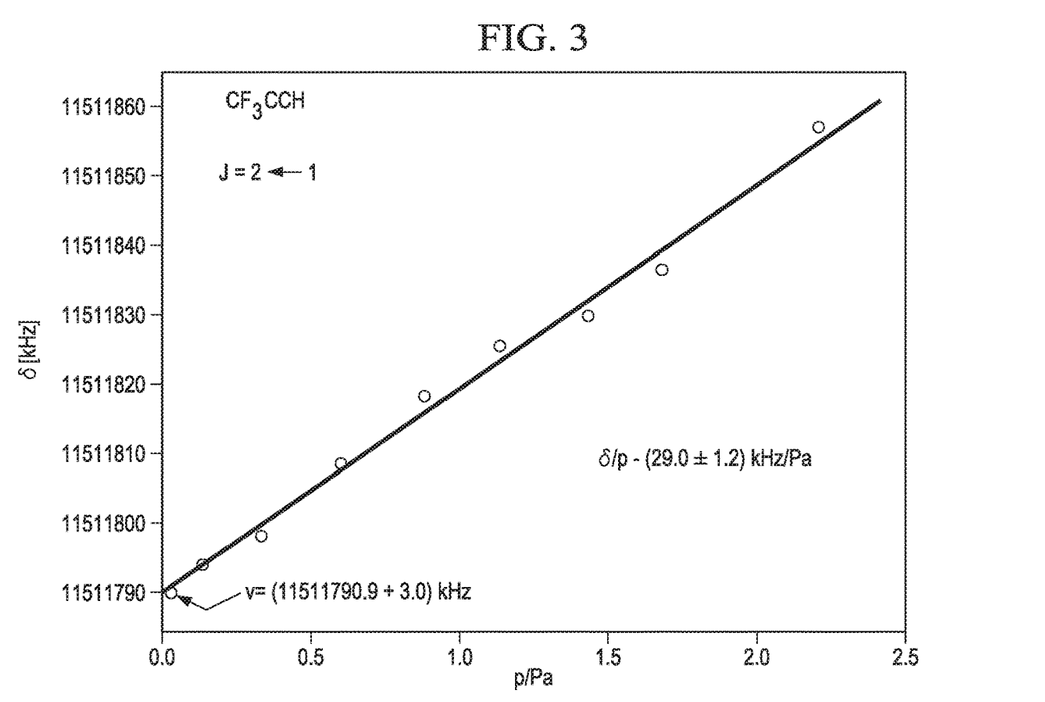
FIG. 3 shows an example of change in frequency of quantum rotational state transition for a dipolar molecule having a pressure sensitive frequency of quantum rotational state transition in accordance with various embodiments.

The dipolar molecules 106 exhibit a frequency of quantum rotational state transition that changes with the pressure within the cavity 102. For example, as the pressure within the cavity 102 increases, the frequency of a quantum rotational state transition of the dipolar molecules 106 also increases. In some embodiments, the dipolar molecules 106 are trifluoropropyne ($CF_3CCH$). In some embodiments, the dipolar molecules 106 are molecules other than $CF_3CCH$ that exhibit a frequency of quantum rotational state transition that changes with pressure. FIG. 3 shows change in frequency of quantum rotational state transition of $CF_3CCH$ molecules with change in pressure. In some embodiments, the dipolar molecules 106 are selected to have a frequency of quantum rotational state transition that is relatively close to the frequency of quantum rotational state transition of the dipolar molecules 104 to narrow the frequency band over which the antennas 108 and 110, and other components of the system 100 must operate.

Figure 4:
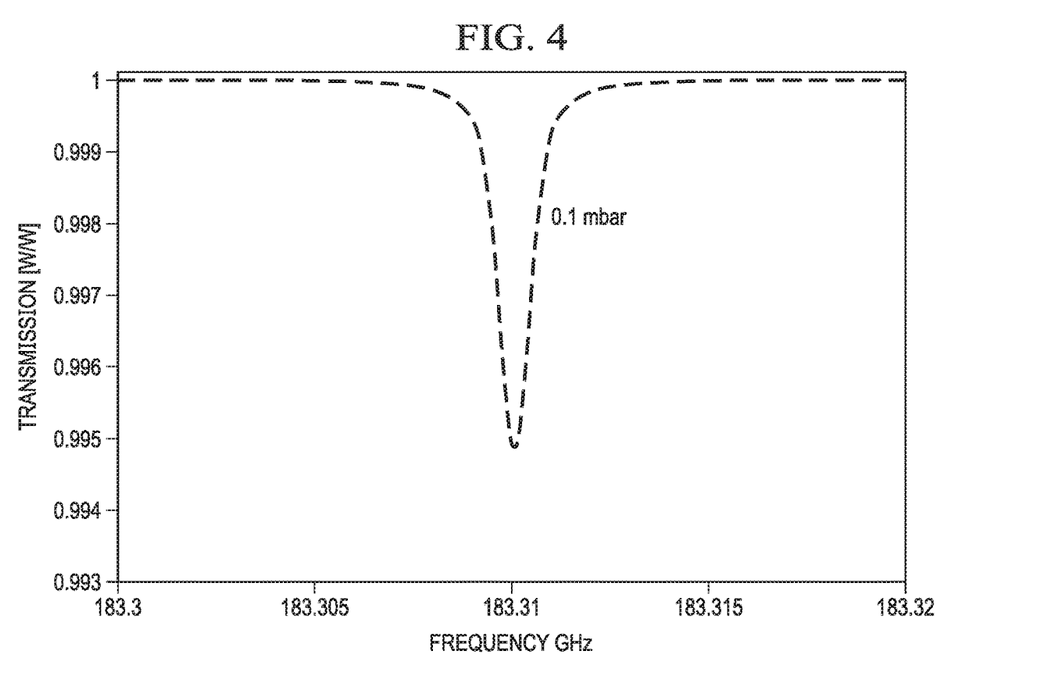
FIG. 4 shows an example of change in detected signal amplitude about the frequency of quantum rotational state transition of a dipolar molecule in accordance with various embodiments.

The transmit antenna 108 is disposed proximate the non-conductive aperture 122 to introduce signal into the cavity 102. The receive antenna 110 is disposed proximate the non-conductive aperture 124 to detect signal exiting the cavity 102. Each of the dipolar molecules 104 and 106 absorbs energy of the signal propagating through the cavity 102 at the molecule's frequency of quantum rotational state transition. Accordingly, embodiments determine the frequency of quantum rotational state transition of each of the molecules 104 and 106 by monitoring the amplitude of the signal detected by the receive antenna 110. FIG. 4 shows an example of the change in detected signal amplitude about the frequency of quantum rotational state transition of the molecules 104 (where the molecules 104 are water molecules). FIG. 4 shows that the peak absorption of signal by the water molecules occurs at about 183.31 giga-hertz (GHz). As explained above, the frequency of quantum rotational state transition, and in-turn the peak absorption frequency, of the dipolar molecules 104 does not vary with pressure. Accordingly, for any internal pressure of the cavity 102 the peak absorption frequency of water molecules 104 will be at 183.31 GHz. The dipolar molecules 106 produce a similar change in detected signal amplitude at the frequency of quantum rotational state transition. As noted above, the frequency of quantum rotational state transition of the dipolar molecules 106 varies with the internal pressure of the cavity 102. Embodiments determine the frequency of quantum rotational state transition of the dipolar molecules 106 by identifying the frequency of peak signal absorption by the dipolar molecules 106.

Because the peak absorption frequency of the dipolar molecules 104 is pressure invariant, and the peak absorption frequency of the dipolar molecules 106 is a function of pressure, the difference between the peak absorption frequency of the dipolar molecules 104 and the peak absorption frequency of the dipolar molecules 106 is directly related to the pressure within the cavity 102. Embodiments determine the pressure within the cavity 102 at a given time based on the difference in the frequencies of peak absorption of the dipolar molecules 104 and 106 at the given time.

The detector circuitry 112 includes circuits that generate the signals driven into the cavity 102 and process the signals output from the cavity 102 to determine the pressure within the cavity 102. The detector circuitry 112 includes a phase locked loop (PLL) 114, frequency identification circuitry 116, and pressure determination circuitry 118. The PLL 114 is coupled to the transmit antenna 108. Some embodiments of the detector circuitry 112 include a driver circuit (not shown) to drive an output of the PLL 114 to the transmit antenna 108. The PLL 114 generates a range of frequencies (e.g., a sweep of frequencies) that include the frequencies of peak absorption of the dipolar molecules 104 and 106. Thus, the frequency of the signal driven into the cavity 102, via the transmit antenna 108, varies with time and includes the frequencies of peak absorption of the dipolar molecules 104 and 106. For example, if the pressure invariant frequency of peak absorption of the molecules 104 is F1 and the pressure variant frequency of peak absorption of the molecules 106 ranges from F2 to F3 (where F3>F2>F1), then the PLL 114 generates a frequency sweep having a start frequency that is less than F1 and an end frequency that is greater than F3.

The signal generated by the PLL 114 propagates through the cavity 102 to the receive antenna 110. The frequency identification circuitry 116 receives the signal detected by the receive antenna 110, and processes the received signal to determine the pressure invariant frequency of peak absorption of the molecules 104 and the pressure variant frequency of peak absorption of the molecules 106. For example, an embodiment of the frequency identification circuitry 116 includes a mixer that multiplies the received signal and the output of the PLL 114 and a low-pass filter that generates a DC signal from the output of the mixer, where the DC signal is representative of the amplitude of the signal received from the cavity 102 at the frequency generated by the PLL 114. Embodiments of the frequency identification circuit 116 identify the frequencies of peak absorption as local minima in the filter output. In various embodiments, the difference between the frequencies of peak absorption of the molecules 104 and 106 is identified as time difference between the local minima, a difference in control voltage in the PLL 114 associated with the frequencies corresponding to the local minima, or difference in other values corresponding to the frequencies produced by the PLL 114 at the local minima.

The frequency identification circuitry 116 provides a value corresponding to the difference between the frequencies of peak absorption of the molecules 104 and 106, or values corresponding to the frequencies of peak absorption of the molecules 104 and 106 to the pressure determination circuitry 118. The pressure determination circuitry 118 generates a value that represents the pressure within the cavity 102 based on the difference in the frequencies of peak absorption of the molecules 104 and 106. For example, an embodiment of the pressure determination circuitry 118 includes a table of pressure values that relates pressure to the difference in the frequencies of peak absorption of the molecules 104 and 106, and the pressure determination circuitry 118 accesses the table based on the difference in frequency to retrieve a pressure value. Some embodiments of the pressure determination circuitry 118 compute a value of pressure based on the difference in frequency. For example, in some embodiments, pressure is linear or non-linear function of difference in the peak absorption frequencies and the pressure determination circuitry 118 evaluates the function at the difference in frequency to produce a value of pressure in the cavity 102. Some embodiments of the pressure determination circuitry 118 provide the value of pressure to circuitry external to the pressure transducer 100.

Figure 5:
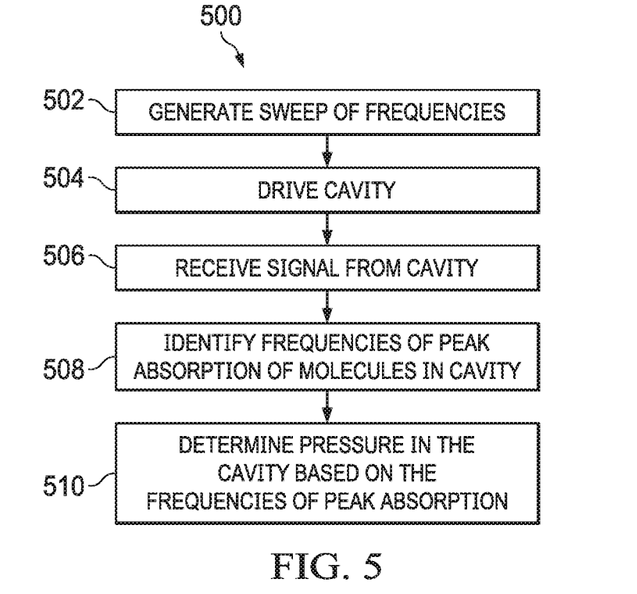
FIG. 5 shows a flow diagram for a method for measuring pressure based on the frequencies of quantum rotational state transition of two dipolar molecules in accordance with various embodiments.

FIG. 5 shows a flow diagram for a method 500 for measuring pressure based on the frequencies quantum rotational state transition of two molecules in accordance with various embodiments. Though depicted sequentially as a matter of convenience, at least some of the actions shown can be performed in a different order and/or performed in parallel. Additionally, some implementations may perform only some of the actions shown. In some implementations, at least some of the operations of the method 500 can be implemented by the transducer 100.

In block 502, a signal that includes a sweep of frequencies is generated. For example, the PLL 114 generates a sweep of frequencies. The range of frequencies included in the sweep include the frequency of quantum rotational state transition of a first dipolar molecule 104 and the frequency of quantum rotational state transition of a second dipolar molecule 106. The frequency of quantum rotational state transition of the first dipolar molecule is pressure invariant, and the frequency of quantum rotational state transition of the second dipolar molecule varies with pressure.

In block 504, the signal is driven into a sealed cavity that contains the first dipolar molecule and the second dipolar molecule. For example, the signal is driven into the cavity 102 via the transmit antenna 108.

In block 506, the signal passes through the cavity and at specific frequencies causes the first dipolar molecule and the second dipolar molecule. to transition from one quantum rotational state to another. Circuitry external to the cavity receives the signal output from the cavity. For example, the receive antenna 110 detects the signal output of the cavity 102 and provides the detected signal to the detector circuitry 112.

In block 508, the frequencies of peak absorption of the first dipolar molecule and the second dipolar molecule are identified. The frequencies of peak absorption of the first dipolar molecule and the second dipolar molecule are the frequencies of the quantum rotational transition of the first dipolar molecule and the second dipolar molecule. Some embodiments determine the frequencies of peak absorption of the first dipolar molecule and the second dipolar molecule by multiplying the signal received from the cavity and the signal driven into the cavity. In such embodiments, the product is low-pass filtered to generate a DC signal that represents the amplitude of the signal received from the cavity 102 at the frequency of the signal driven into the cavity. The frequencies of peak absorption are identified as local minima in the low-pass filtered signal.

In block 510, the pressure within the cavity is determined based on the frequencies of peak absorption (i.e., the frequencies of quantum rotational state transition) of the first dipolar molecule and the second dipolar molecule. The difference in the frequencies of peak absorption of the first dipolar molecule and the second dipolar molecule is determined. The difference in frequency is directly related to the pressure within the cavity. Accordingly, a value of frequency difference is employed to access a table that relates frequency difference to pressure, or to evaluate a function that produces pressure based on frequency difference.

Figure 6:
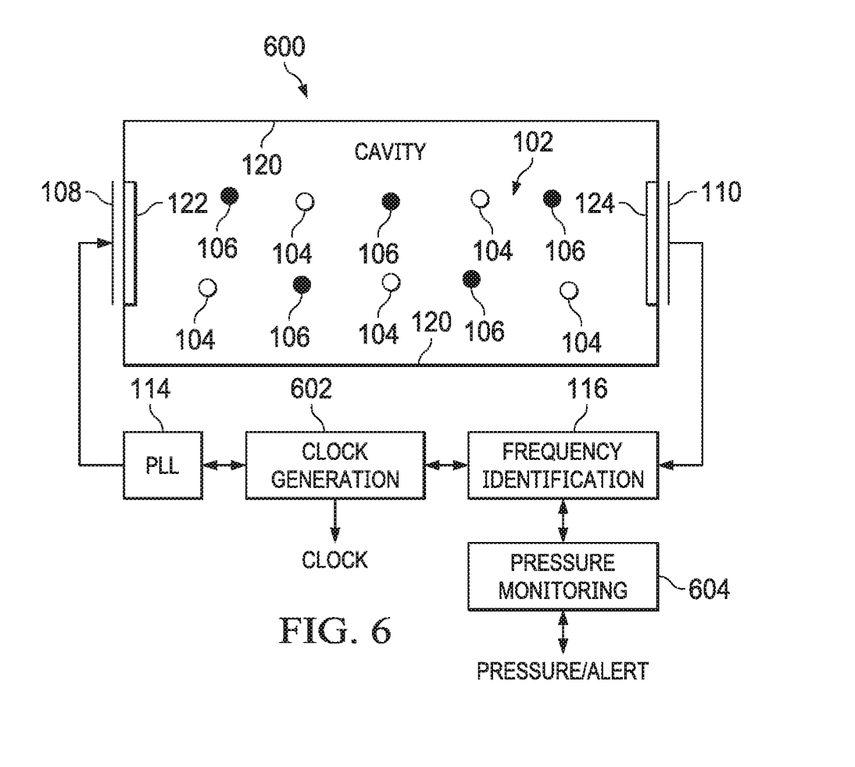
FIG. 6 shows a block diagram for a clock generator that includes pressure measurement based on the frequencies of quantum rotational state transition of two dipolar molecules in accordance with various embodiments.

FIG. 6 shows a block diagram for a clock generator 600 that includes pressure measurement based on the frequencies of quantum rotational state transition two molecules in accordance with various embodiments. The clock generator 600 is a millimeter wave atomic clock that generates a reference frequency based on the frequency of quantum rotational state transition of selected dipolar molecules contained in a hermetically sealed cavity 102 formed in substrate material (e.g., a semiconductor, such as silicon, or a ceramic material). The reference frequency produced by quantum rotational state transition of the selected dipolar molecules is unaffected by circuit aging and does not vary with temperature or other environmental factors. Various components of the clock generator 600 are similar to those of the pressure transducer 100, and such components are identified by use of the reference numerals employed in FIG. 1. The clock generator 600 monitors the pressure within the sealed cavity 102 to ensure that the necessary conditions for operation are maintained. At manufacture, the pressure with the cavity 102 is set to an optimal value for accurately generating the reference frequency. If the internal pressure of the cavity 102 deviates from the optimal value by more than a predetermined amount, the accuracy of the clock generator 600 may be reduced. Accordingly, embodiments of the clock generator 600 identify changes in internal pressure of the cavity 102 and provide pressure information to circuits external to the clock generator 600.

The clock generator 600 includes a cavity 102, molecules 104 and 106, transmit antenna 108, receive antenna 110, a PLL 114, frequency identification circuitry 118, clock generation circuitry 602, and pressure monitoring circuitry 604. The cavity 102 is a sealed chamber formed in a substrate material (e.g., a semiconductor or ceramic material). In some embodiments, microelectromechanical system (MEMS) fabrication processes are used to construct the cavity 102. The cavity 102 includes conductive interior surfaces 120 and non-conductive apertures 122 and 124. The cavity 102 with conductive interior surfaces 120 forms a waveguide. The non-conductive aperture 122 provides an electromagnetic field entrance to the cavity 102. The non-conductive aperture 124 provides an electromagnetic field exit from the cavity 102.

The cavity 102 contains vapor molecules 104 and 106. The molecules 104 and 106 are dipolar molecules that exhibit quantum rotational state transitions at different frequencies. Dipolar molecules 104 exhibit a quantum rotational state transition at a frequency that is unaffected by the pressure within the cavity 102. For example, as the pressure within the cavity 102 increases, the frequency of quantum rotational state transition of the dipolar molecules 104 remains constant. In some embodiments, the dipolar molecules 104 are water molecules ($H_2O$). In some embodiments, the dipolar molecules 104 are molecules other than water that exhibit a frequency of quantum rotational state transition that is unaffected by pressure. The dipolar molecules 106 exhibit a frequency of quantum rotational state transition that changes with the pressure within the cavity 102. For example, as the pressure within the cavity 102 increases, the frequency of quantum rotational state transition of the dipolar molecules 106 also increases. In some embodiments, the dipolar molecules 106 are trifluoropropyne ($CF_3CCH$). In some embodiments, the dipolar molecules 106 are molecules other than $CF_3CCH$ that exhibit a frequency of quantum rotational state transition that changes with pressure. In some embodiments, the dipolar molecules 106 are selected to have a frequency of quantum rotational state transition that is relatively close to the frequency of quantum rotational state transition of the dipolar molecules 104 to narrow the frequency band over which the antennas 108 and 110, and other components of the system 600 must operate. The frequency of quantum rotational state transition of the dipolar molecules 104 outside a range of frequencies of quantum rotational state transition of the dipolar molecules 106 in at least some embodiments.

The transmit antenna 108 is disposed proximate the non-conductive aperture 122 to introduce signal into the cavity 102. The receive antenna 110 is disposed proximate the non-conductive aperture 124 to detect signal exiting the cavity 102. Each of the dipolar molecules 104 and 106 absorbs energy of the signal propagating through the cavity 102 at the molecule's frequency of quantum rotational state transition. Accordingly, the amplitude of the signal received from the cavity 102 at the frequency of quantum rotational state transition of the molecules 104 will be reduced relative to adjacent frequencies, and embodiments determine the frequency of quantum rotational state transition of each of the molecules 104 and 106 by monitoring the amplitude of the signal detected by the receive antenna 110. As explained above, the frequency of quantum rotational state transition, and in-turn the peak absorption frequency, of the dipolar molecules 104 does not vary with pressure. Accordingly, for all internal pressures of the cavity 102 the peak absorption frequency of the dipolar molecules 104 will be constant. Like the dipolar molecules 104, the dipolar molecules 106 produce a change in detected signal amplitude at the frequency of quantum rotational state transition. As noted above, the frequency of quantum rotational state transition of the dipolar molecules 106 varies with the internal pressure of the cavity 102. Embodiments determine the frequency of quantum rotational state transition of the dipolar molecules 106 by identifying the frequency of peak signal absorption by the dipolar molecules 106.

Because the peak absorption frequency of the dipolar molecules 104 is pressure invariant, and the peak absorption frequency of the dipolar molecules 106 is a function of pressure, the difference between the peak absorption frequency of the dipolar molecules 104 and the peak absorption frequency of the dipolar molecules 106 is directly related to the pressure within the cavity 102. Embodiments determine the pressure within the cavity 102 at a given time based on the difference in the frequencies of peak absorption of the dipolar molecules 104 and 106 at the given time.

The PLL 114 is coupled to the transmit antenna 108. In some embodiments, the detector circuitry 112 includes a driver circuit (not shown) to drive an output of the PLL 114 to the transmit antenna 108. The PLL 114 generates a range of frequencies (e.g., a sweep of frequencies) that include the frequencies of peak absorption of the dipolar molecules 104 and 106. Thus, the frequency of the signal driven into the cavity 102, via the transmit antenna 108, varies with time and includes the frequencies of peak absorption of the dipolar molecules 104 and 106. For example, if the pressure invariant frequency of peak absorption of the dipolar molecules 104 is F1 and the pressure variant frequency of peak absorption of the dipolar molecules 106 ranges from F2 to F3 (where F3>F2>F1), then the PLL 114 generates a frequency sweep having a start frequency that is less than F1 and an end frequency that is greater than F3.

The signal generated by the PLL 114 propagates through the cavity 102 to the receive antenna 110. The frequency identification circuitry 116 receives the signal detected by the receive antenna 110, and processes the received signal to determine the frequency of peak absorption of the dipolar molecules 104 and the pressure variant frequency of peak absorption of the dipolar molecules 106. For example, an embodiment of the frequency identification circuitry 116 includes a mixer that multiplies the received signal and the output of the PLL 114 and a low-pass filter that generates a DC signal from the output of the multiplier, where the DC signal is representative of the amplitude of the signal received from the cavity 102 at the frequency generated by the PLL 114. Embodiments of the frequency identification circuit 116 identify the frequencies of peak absorption as local minima in the filter output. In various embodiments, the difference between the frequencies of peak absorption of the molecules 104 and 106 is identified as time difference between the local minima, a difference in control voltage in the PLL 114 associated with the frequencies corresponding to the local minima, or difference in other values corresponding the frequencies produced by the PLL 114 at the local minima.

The frequency identification circuitry 116 provides a value corresponding to the difference between the frequencies of peak absorption of the molecules 104 and 106, or values corresponding to the frequencies of peak absorption of the molecules 104 and 106 to the pressure monitoring circuitry 604. The pressure monitoring circuitry 604 generates a value that represents the pressure within the cavity 102 based on the difference in the frequencies of peak absorption of the molecules 104 and 106. For example, an embodiment of the pressure monitoring circuitry 604 includes a table that relates pressure to the difference in the frequencies of peak absorption of the molecules 104 and 106, and the pressure determination circuitry 118 accesses the table based on the difference in frequency to retrieve a pressure value. Some embodiments of the pressure monitoring circuitry 604 compute a value of pressure based on the difference in frequency. For example, in some embodiments, pressure is linear or non-linear function of difference in frequency and the function is evaluated at the difference in frequency to produce a value of pressure in the cavity 102. Some embodiments of the pressure monitoring circuitry 604 provide values of cavity pressure to circuits external to the clock generator 600. Given a value of pressure within the cavity 102, some embodiments of the pressure monitoring circuitry 604 compare the value of pressure to upper and/or lower limit values. If the value of pressure within the cavity 102 exceeds the upper limit value or is less than the lower limit value, then the pressure monitoring circuitry 604 transmits an alert signal to circuitry external to the clock generator 600 to notify the external circuitry of a change in cavity pressure that may affect operation of the clock generator 600.

The clock generation circuitry 602 is coupled to the frequency identification circuitry 116. The clock generation circuitry 602 produces an output clock signal having a frequency that is locked to the frequency of peak absorption of the dipolar molecules 104. In some embodiments, the clock generation circuitry 602 includes an oscillator (e.g., a crystal oscillator) the frequency of which is adjusted based on the frequency of peak absorption of the dipolar molecules 104. Thus, the output clock signal generated by the clock generation circuitry is pressure and temperature invariant and locked to a frequency reference (e.g., the frequency of quantum rotational state transition of the dipolar molecules 104) that does not change over time.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A pressure transducer, comprising:
a cavity having a cavity pressure;
a first dipolar molecule within the cavity the first dipolar molecule having a first quantum rotational state transition at a fixed frequency with respect to the cavity pressure;
a second dipolar molecule within the cavity, the second dipolar molecule having a second quantum rotational state transition at a variable frequency that varies with the cavity pressure; and
pressure determination circuitry configured to determine the cavity pressure based on a difference between: a first frequency of peak absorption for the first dipolar molecule; and a second frequency of peak absorption for the second dipolar molecule.

2. The pressure transducer of claim 1, wherein the fixed frequency is outside a range of the variable frequency.

3. The pressure transducer of claim 1, further comprising:
a first antenna coupled to the cavity, the first antenna configured to transmit a first signal into the cavity; and
a second antenna coupled to the cavity, the second antenna configured to receive a second signal from the cavity.

4. The pressure transducer of claim 3, further comprising detector circuitry coupled to the second antenna, the detector circuitry configured to determine the first and second frequencies.

5. The pressure transducer of claim 4, wherein the detector circuitry includes:
a phase-locked loop (PLL) configured to sweep a range of frequencies, the range of frequencies including the fixed frequency and the variable frequency; and
frequency identification circuitry configured to determine the first and second frequencies based on the frequencies swept by the PLL.

6. The pressure transducer of claim 1, wherein the first dipolar molecule is $H_2O$ and the second dipolar molecule is $CF_3CCH$.

7. A method, comprising:
transmitting a signal into a cavity having a cavity pressure, the cavity including:
a first dipolar molecule having a first quantum rotational state transition at a fixed frequency with respect to the cavity pressure; and
a second dipolar molecule having a second quantum rotational state transition at a variable frequency that varies with the cavity pressure; and
determining the cavity pressure based on a difference between the fixed frequency and the variable frequency.

8. The method of claim 7, wherein the fixed frequency is non-overlapping with a range of the variable frequency.

9. The method of claim 7, wherein the signal is a first signal, and the method further comprises:
receiving a second signal output from the cavity via a receive antenna coupled to the cavity;
in which the transmitting includes driving a transmit antenna coupled to the cavity.

10. The method of claim 7, wherein the signal is a first signal, and the method further comprises processing a second signal output from the cavity to determine: a first frequency of peak absorption for the first dipolar molecule; and a second frequency of peak absorption for the second dipolar molecule.

11. The method of claim 10, further comprising:
generating a sweep of frequencies over a range that includes the fixed frequency and the variable frequency; and
determining the first and second frequencies based on the sweep of frequencies.

12. The method of claim 10, further comprising determining the cavity pressure based on a difference between the first and second frequencies.

13. A clock generator, comprising:
a hermetically sealed cavity in a silicon substrate, the cavity having a cavity pressure;
a first dipolar molecule within the cavity, the first dipolar molecule having a quantum rotational state transition at a fixed frequency with respect to the cavity pressure; and
a second dipolar molecule within the cavity, the second dipolar molecule having a quantum rotational state transition at a variable frequency that varies with the cavity pressure;
clock generation circuitry configured to generate an output clock signal based on the fixed frequency; and
pressure monitoring circuitry configured to determine the cavity pressure based on a difference between the fixed frequency and the variable frequency.

14. The clock generator of claim 13, wherein the fixed frequency is outside a range of the variable frequency.

15. The clock generator of claim 13, further comprising:
a first antenna coupled to the cavity, the first antenna configured to transmit a first signal into the cavity; and
a second antenna coupled to the cavity, the second antenna configured to receive a second signal from the cavity.

16. The clock generator of claim 15, further comprising frequency identification circuitry coupled to the second antenna, the frequency identification circuitry configured to determine: a first frequency of peak absorption for the first dipolar molecule; and a second frequency of peak absorption for the second dipolar molecule.

17. The clock generator of claim 16, wherein the clock generation circuitry is configured to generate the output clock based on the first frequency.

18. The clock generator of claim 16, wherein the pressure monitoring circuitry is configured to determine the cavity pressure based on a difference between the first and second frequencies.

19. The clock generator of claim 13, wherein the pressure monitoring circuitry is configured to generate an alert signal based on the difference between the fixed frequency and the variable frequency.

* * * * *